UNITED STATES PATENT OFFICE.

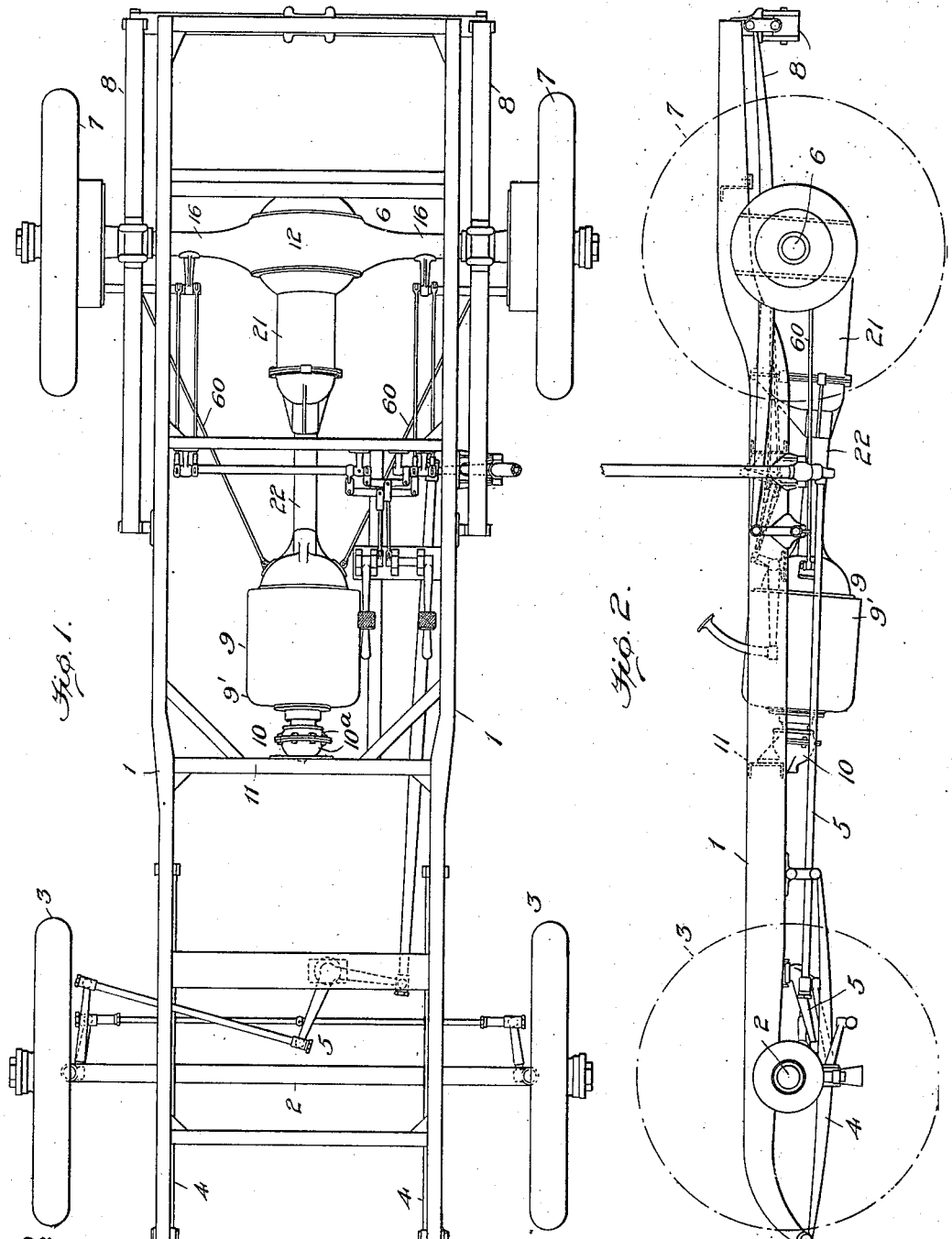

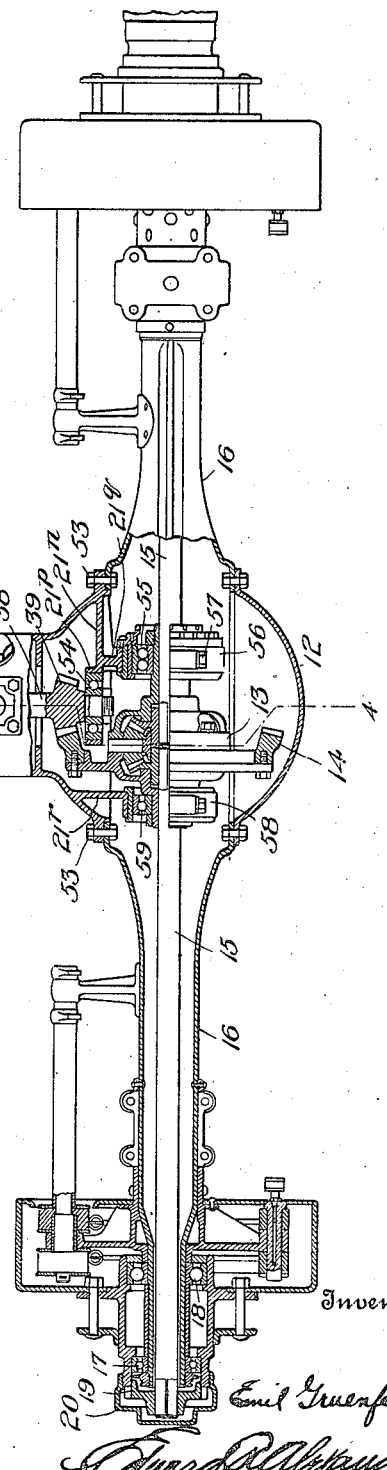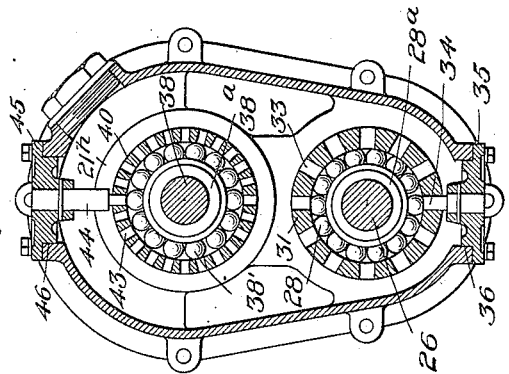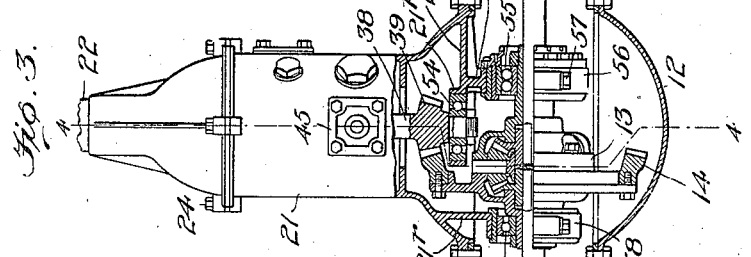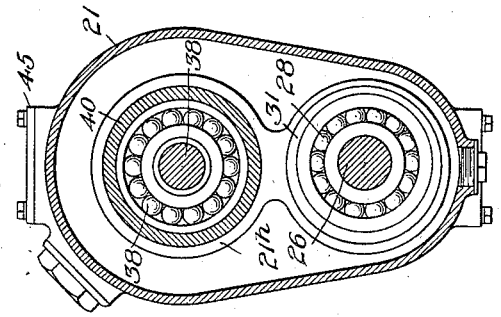

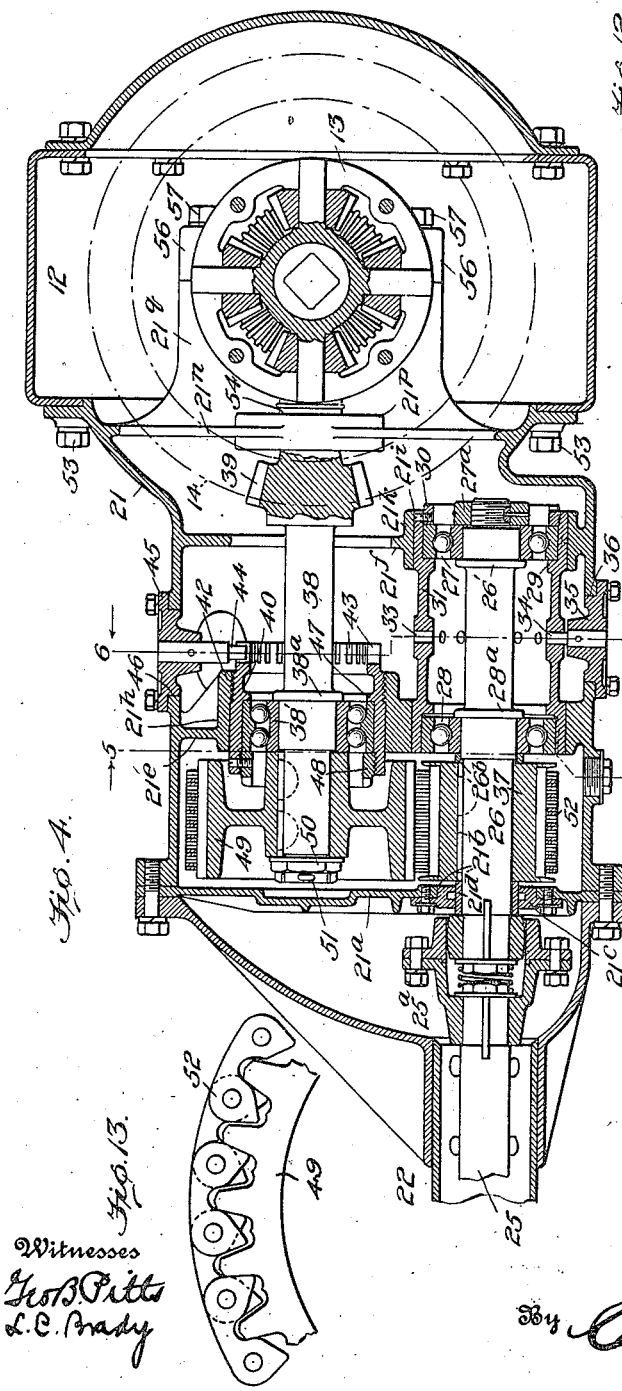

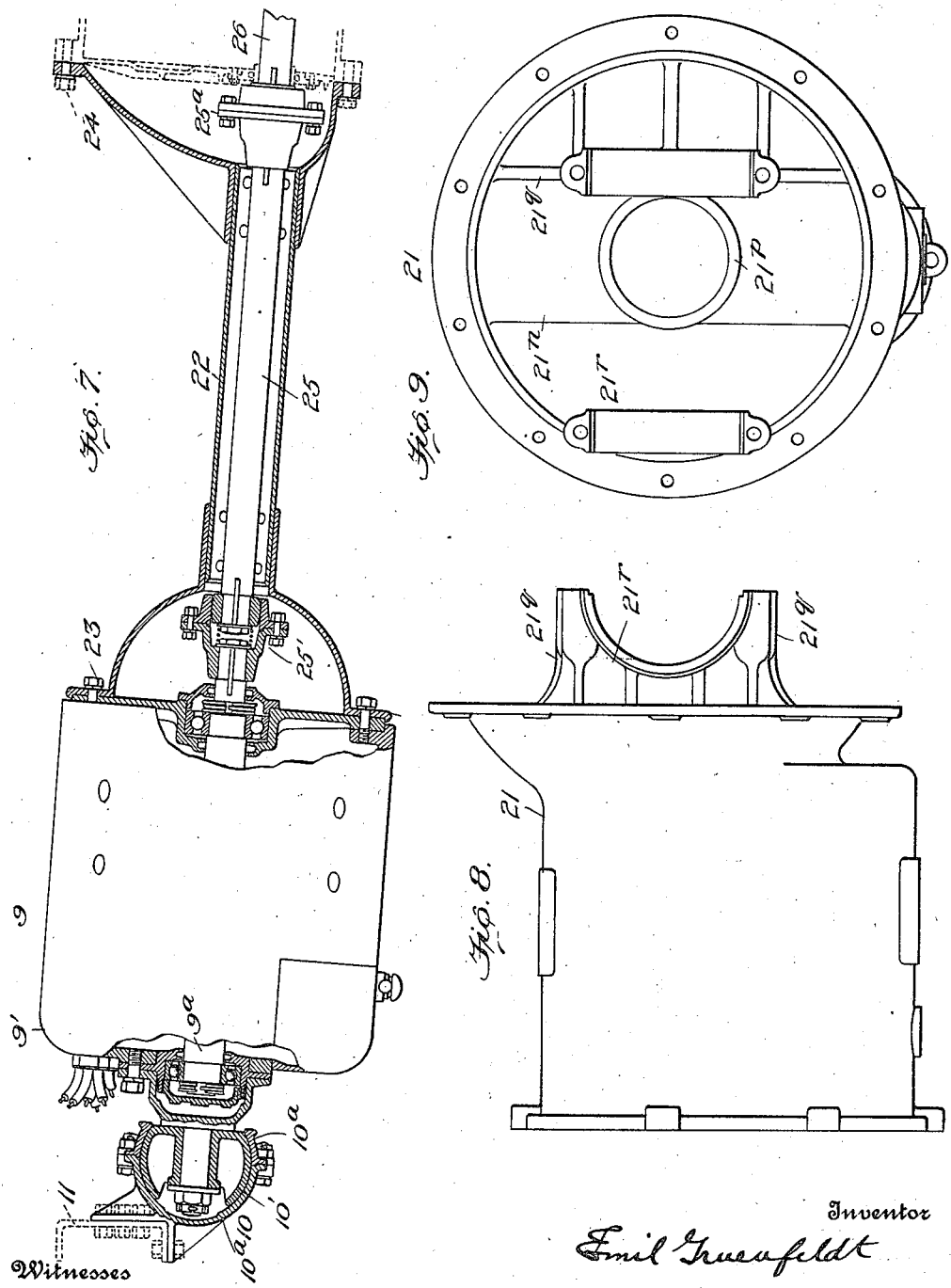

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

MOTOR-VEHICLE.

1,139,674.      Specification of Letters Patent.      Patented May 18, 1915.

Application filed March 17, 1913. Serial No. 754,982.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Motor-Vehicles, of which the following is a specification.

This invention relates to improvements in motor vehicles, more particularly motor vehicles in which an electric motor is employed for translating power for propelling the vehicles.

One of the objects of my invention is to support an electric motor from the frame of a motor vehicle in such manner as to permit the motor during the normal operation of the vehicle, to readily and freely accommodate itself to any position into which the movements of the rear drive axle may tend to swing it relatively to the frame.

Another object of my invention is to employ a relatively high speed motor and at the same time support it from the vehicle frame so as to permit the floor boards of the vehicle body to be disposed relatively close to the ground to provide a comparatively low hung chassis, as an entirety, the necessary speed gear reduction between the armature shaft and the rear axle mechanism being arranged and disposed to accommodate such suspension of the motor in an efficient and practical manner.

Other objects of my invention will be readily appreciated by one skilled in this art from the description of one form of motor vehicle embodying it, which for the purpose of illustration, I have, in the accompanying drawings, shown and hereinafter described.

Figure 1 is a top plan view of a motor vehicle chassis, the body therefor not being shown. Fig. 2 is a side elevation of the parts shown in Fig. 1. Fig. 3 is a view of the rear axle mechanism and transmission gear casings, partly in plan and partly in section. Fig. 4 is a section through the differential gear and the driven connections between it and the driven shaft, on the line 4—4 of Fig. 3. Figs. 5 and 6 are sections on the lines 5—5 and 6—6, respectively of Fig. 4. Fig. 7 is a fragmentary view, partly in section and partly in elevation, of the motor and motor case, the propeller shaft, the propeller shaft case, the motor suspension joint and associated parts. Fig. 8 is an elevation of the gear casing. Fig. 9 is a rear end view of the gear casing. Figs. 10, 11 and 12 are detail views of the universal joint, and Fig. 13 is a detail of the chain and sprocket.

In the drawings, 1 illustrates a suitable frame. It may be formed largely of channel iron or steel in the well known manner, or otherwise constructed for its purpose as desired.

At its front end this frame is preferably supported by an axle 2, steering wheels 3, and springs 4, all of which parts may be of any desired construction. Likewise the steering mechanism illustrated in the drawings and indicated by the numeral 5 may be of any suitable and preferred form, and accordingly, it is not necessary to describe these parts in detail.

At its rear end the frame 1 is preferably supported by rear drive axle mechanism 6, driving wheels 7, and a so-called platform spring suspension 8. These parts in themselves also form no part of my invention and may accordingly be of any desired character.

9 indicates an electric motor. Its casing 9' at its front end is preferably rigidly secured to the ball member 10' of a universal joint 10, the cup element 10$^a$ of which joint is rigidly secured to a cross bar 11 on the frame 1. This universal joint is arranged in alinement, as shown, with the armature shaft 9$^a$ of the motor, its construction and disposition being such as to permit the motor to swing in substantially all directions and also to turn or oscillate about the axis of its armature shaft. The motor 9 is preferably of the type now commonly known as a high speed motor, one, in other words, in which the number of revolutions per minute made by its armature shaft in the normal operation of the motor in an electric motor vehicle with present day storage battery equipment is so high that, in order to obtain requisite driving speeds without great waste of current through resistances, it is necessary, where a bevel gear reduction drive is employed in the rear axle mechanism, to introduce another reduction gearing somewhere between the armature shaft and the driving bevel of the rear axle mechanism.

By mounting the motor as I have done it is possible to get a low hung chassis, and particularly is this true by arranging all of the speed reduction gearing on or at the rear axle, as illustrated.

I have shown the rear drive axle mechanism 6 to be what is commonly called of the full floating type. 12 is the centrally disposed enlargement of the axle housing to receive the differential mechanism 13. 14 is the driven bevel wheel carried by the differential housing. 15 are the divided driven axle sections, each of which extends through one of the laterally extending axle tubes 16. The mounting of the driving wheels 7 on the axle tubes and their driving connection with the axle sections 15 may be of any suitable type. I have illustrated each of the wheel hubs as mounted on anti-friction bearings 17, 18, and connected to the adjacent drive shaft section 15 by a clutch 19, the members of which are held in engagement in the well known manner by cap 20.

21 is a gear casing extending forward from and secured to the enlarged portions 12 of the rear axle housing. 22 is a tube or case interposed between the gear casing 21 and the motor casing 9′. At the front end it is rigidly connected to the motor casing by bolts 23 and at its rear end it is rigidly connected to the gear casing 21 by bolts 24.

The casing 21 is closed at its front end by a member or plate 21$^a$, which is held in place by the bolts 24. At 21$^b$ this member 21$^a$ is formed with a suitable opening through which a shaft 26 extends. The opening 21$^b$ is preferably of a size to provide for a collar 21$^c$ and bearing sleeve 21$^d$ which close the space around the shaft 26 to keep out the dust and foreign matter. The collar 21$^c$ may be detachably held in place in a well known manner, as by bolts.

21$^e$, 21$^f$ indicate transverse supporting and strengthening webs arranged within the casing 21. These webs are spaced from each other and preferably formed integral with the circumferential walls of the casing. The web 21$^e$ is formed with upper and lower openings. Around the former opening and extending from opposite faces of the web 21$^e$ are provided contiguous collars 21$^h$ the inner walls of which form a bearing for an adjustable sleeve 40.

21$^i$ indicates an opening formed in the lower portion of the web 21$^f$. The opening 21$^i$ is preferably formed with circumferential flanges 21$^k$, the inner walls of which form a bearing and aline with the walls of the lower opening in the web 21$^e$ to rotatably support eccentrically to the axle of the shaft 26 the opposite ends of an adjustable tube 31.

25 is a propeller shaft extending through the case or tube 22 and suitably connected at its front end by a coupling 25′ to the rear end of the armature shaft 9$^a$ and at its rear end by a coupling 25$^a$ to the front end of the shaft 26. The couplings 25′ and 25$^a$ may, as indicated, be of a type which will allow relatively longitudinal movement of the parts they connect as well as limited universal movement, to facilitate in assembly of the parts and to adapt the structure to simple and effective manufacturing standards. The shaft 26 is longitudinally disposed within the gear casing 21 and the adjustment tube 31. It is mounted at its rear end in a bearing 27 carried by and arranged at the rear end of the tube 31, and intermediate of its ends in a bearing 28 mounted at the front end of said tube. This shaft 26 is held against longitudinal movement or thrusts by means of a collar or annular boss 26′ which engages with the bearing 27 on one side and a nut 27$^a$ on the screw threaded end of the shaft 26, which nut engages with the other side of said bearing 27. The bearing 27 is held against longitudinal movement within the sleeve or tube 31 by being pressed into engagement with the annular shoulder 29 in said sleeve and there held by the screw threaded ring 30. The bearing 28 is positioned in the tube 31 by an annular boss 28$^a$, on the shaft 26 and a washer 26$^b$. The bearings 27 and 28 are mounted in the tube 31 eccentric to the axis thereof, so that the axis of the shaft 26 will be eccentric to the axis of the tube 31. To provide for the angular adjustment of the tube 31 there is arranged about its periphery and near the middle of the tube a series of openings 33 each of which may be caused, by rotation of the tube 31, to register with a locking pin 34 carried by a plate 35 detachably secured to the casing 21 so as normally to cover the hand hole 36 through the casing. When this cover 35 is removed the operator may place a tool or spanner in one or more of the openings 33 in the adjustment tube 31 and turn the same as desired.

37 indicates a gear or sprocket suitably keyed to the front end of the driven shaft 26 and arranged between the web 21$^e$ and the front member 21$^a$.

38 is a counter shaft mounted within and extending longitudinally of the casing 21 and arranged above the driven shaft 26 therein. At its rear end the shaft 38 has secured to, or integrally formed with it, a bevel pinion 39 which meshes with the bevel gear 14 of the differential mechanism. Intermediate of its ends the shaft 38 is mounted in a bearing 38′ which is arranged within the adjustment sleeve 40. This bearing is shown to be one capable both of taking loads and end thrusts.

The rear end of the sleeve 40 is screw threaded to fit the screw threaded portion 42 in the web or partition 21$^e$ which surrounds it. The extreme rear end of the sleeve 40 is notched or recessed at 43 to receive the inner end of the locking pin 44, carried by the cover plate 45 detachably secured to the casing 21 so as to normally cover the hand opening 46 therethrough.

The bearing 38' at its rear end is pressed against an annular shoulder 47 within the sleeve 40. It is held against this shoulder by means of a screw threaded ring 48 which presses against the front edge of the race of the bearing.

49 indicates a gear or sprocket keyed in a well known manner to the front portion of the counter shaft 38. At its free end the shaft 38 is screw threaded to receive a nut 50 and lock nut 51. These nuts hold the gear 49 in engagement with the inner bearing member of the bearing 38', which member in turn is pressed against an annular shoulder 38$^a$ provided on the shaft 38. A silent chain 52 connects the gears or sprockets 37 and 49 for power transmitting purposes. As clearly shown in the drawings, the gear 49 is larger than the gear 37 so that a reduction in speed of the countershaft 38 to the speed of the shaft 26 is effected.

At its rear end the casing 21 is secured to the front end of the enlarged section 12 of the rear axle housing as by means of bolts 53. Adjacent to its rear end the casing 21 has an inwardly extending wall or flange 21$^n$ from which extends a bearing ring 21$^p$ arranged to receive a bearing 54 for the extreme rear end of the countershaft 38. The flange 21$^n$ has a rearward extension 21$^q$ forming one section of a two part hanger or support for the bearing 55 for one end of the differential mechanism, the other part of said bearing hanger or support being a strap or block 56 secured to the extension 21$^q$ by bolts 57. At the other side of the differential mechanism 13 the casing 21 has a rearward extension 21$^r$ which forms with a strap or block 58 a support or hanger for the differential bearing 59. The parts 58 and 21$^r$ may be detachably connected together, as by means of bolts, as illustrated.

The operation of the various parts will be readily understood. It should be noted that the driving or propelling force for the vehicle as an entirety is transmitted from the rear wheels through the rear axle housing, thence through the casing 21, tube 22, motor casing 9', ball 10', and cup 10$^a$ to the frame. The propelling force is applied to the frame at a point in advance of the motor. Each of the side springs of the rear spring suspension system is shackled at its front end to the frame and at its rear end to the transverse platform spring, so as to allow relative movement of frame and spring during elastic deformations of the spring. The rear axle housing casing 21, tube 22, motor housing 9', and ball 10' move or swing as a unitary structure relative to the frame. The universal joint 10 is in alinement with the axis of the armature shaft so as to permit the ball 10' and casing elements connected therewith, including motor casing 9', tube 22, casing 21 and the rear axle housing, to swing about the axis of the armature shaft. Suitable brake mechanism is employed for the rear wheels, as indicated. The torque action of the rear axle housing, or its effort to turn bodily in either direction about the axis of the live shaft sections, under the influence of starting the rotation of the motor or of stopping the vehicle by applying the brakes, is taken between the ball 10' and the cup 10$^a$, the casing elements interposed between the said ball and the rear axle housing serving as an entirety as a torque tube. Stay rods 60 pivoted at their front ends to the tube 22 and at their rear ends to the rear axle housing may be employed for strengthening the structure and maintaining desired relative position of parts.

By mounting the motor as herein shown and providing the speed reduction gearing entirely at the rear axle, an unusually quiet operating electric motor vehicle is obtained, since the so to speak sound board effect noticeable in electric motor vehicles where the motor and reducing gear are arranged in close proximity to the body of the vehicle, is avoided.

Lateral adjustment of the driven bevel gear 14 to the driving pinion 39 may be effected in any well known manner. Longitudinal adjustment of the bevel pinion 39 to the bevel gear 14 in order to insure quiet running of the gear may be effected by turning the collar 40 in the desired direction. Adjustment of the silent chain 52, where such is employed, may be easily and readily effected by rotating the sleeve 31 in the desired direction.

While I have shown a double reduction at the rear drive axle in the power transmission line, it will be understood that my invention so far as it relates to supporting a motor and connecting its housing with the rear axle housing is equally adaptable where but a single reduction is made at the rear axle, either by a single set of bevel gears, a set of worm gears, or in any other well known manner.

I believe I am the first to support a motor from a motor vehicle frame by means of a universal joint arranged in front of the motor and to have the motor housing directly connected to the housing of a rear drive axle so that they will move as a unitary structure and wherein the parts are so correlated that the drive or propelling force for operating the motor vehicle will be transmitted to the frame entirely through said universal joint for supporting the motor. I also believe that I am the first to support from a motor vehicle frame by a universal joint, an electric motor with its armature shaft in line with said universal joint, the casing of said motor being directly connected with the casing of a rear drive axle, so that the axle and motor will swing as a unitary structure about said universal joint and also about the axis of said armature shaft as a center.

It should be further noted that the construction is such that the desired relationship of the chain gearing and also of the final power transmitting gears 39 and 14 may be adjusted when and while the casing 21 is detached from the rear axle housing. In other words, all of the speed reducing gearing at the rear axle is supported and carried by the casing 21 and this structure as an entirety may be considered as a unitary one either for the purposes of assembly or of attachment to or detachment from the rear axle housing, is being understood that the live axle sections 15 may be withdrawn from or inserted into the differential mechanism at will without disturbing in any manner the differential mechanisms.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:—

1. In an electric motor vehicle, the combination with a vehicle frame, a wheeled support for the front end of said frame, and a wheeled support for the rear end of said frame including a rear drive axle having a housing with live axle sections and differential mechanism incased thereby, of a ball and socket universal joint supported by said frame, an electric motor arranged entirely between said ball and socket joint and said rear axle housing, the said universal joint being arranged in alinement with the armature shaft of said motor and supporting the motor from its front end, gearing connections between the rear end of said armature shaft and said differential mechanism, a rigid support between the motor casing and said rear axle housing, whereby the motor casing and axle housing always swing together as a unitary structure, and connections between the wheeled supports at the rear end of said frame and said frame permitting free relative longitudinal movement of said frame and supports so that the propelling force for the vehicle is transmitted to the frame solely through the elements of said universal joint.

2. In an electric motor vehicle, the combination with a vehicle frame and a rear drive axle for supporting same at its rear end, said rear axle having a housing with live axle sections and differential mechanism incased thereby, of an electric motor rigidly connected to and supported at its rear end by said housing and having its armature shaft disposed longitudinally of said frame, gearing connections between the rear end of said armature shaft and said differential mechanism, a universal joint, one element of said joint being connected with the motor and arranged in alinement with the armature shaft of the motor and entirely in front thereof and the other element of said joint being rigidly connected to said frame, and connections between said rear axle housing and said frame permitting free relative movement of said housing and frame so that the propelling force for the vehicle is transmitted to the frame solely through the elements of said universal joint.

3. In a motor vehicle, the combination with a rear drive axle mechanism including a housing with live axle sections and differential mechanism incased thereby, yielding supports interposed between said housing and frame and connections between said frame and yielding supports permitting the free relative longitudinal movement of said frame and supports, of a universal joint one element of which is rigidly secured to said frame in the vertical longitudinal plane of said differential mechanism, an electric motor arranged entirely between said universal joint and said rear axle mechanism, said motor being supported at its front end by the other element of said universal joint and having the axis of its armature shaft extending through said universal joint, a driving connection between the rear end of said armature shaft and said differential mechanism, and a rigid connection between said motor and said rear axle housing, whereby the motor casing and rear axle housing always move together as a unitary structure and the propelling force for the vehicle is transmitted to the frame solely through the elements of said universal joint.

4. In an electric motor vehicle, the combination with a vehicle frame, a wheeled support for the front end of said frame, and a wheeled support for the rear end of said frame including a rear drive axle having a housing with live axle sections and a differential mechanism incased thereby, of a universal joint one element of which is rigidly connected to said frame, an electric motor arranged entirely between said universal joint and said rear axle housing, said universal joint being arranged in alinement with the armature shaft of said motor and having its movable element supporting the motor from the front end thereof, gearing connections between the rear end of the armature shaft of said motor and said differential mechanism, and a rigid support between the motor casing and said rear axle housing whereby the motor casing and axle housing always swing together as a unitary structure.

5. In an electric motor vehicle, the combination with a vehicle frame, a wheeled support for the front end of said frame, a wheeled support for the rear end of said frame including a rear drive axle having a housing with live axle sections and differential mechanism incased thereby, and resilient supporting means interposed between said axle housing and frame and connected with said frame to permit free relative longitudinal movement between said resilient supporting means and said frame, of an electric motor rigidly connected to and supported at its rear end by said rear axle housing and having its armature shaft disposed longitudinally of said frame, gearing connections between the rear end of said armature shaft and said differential mechanism, and a universal joint, one element of which supports said motor at its front end, and the other element of which is rigidly connected to said frame so that the propelling force for the vehicle is transmitted to the frame solely through the elements of said universal joint and said motor and rear axle always swing together relative to said frame as a unitary structure.

6. In a motor vehicle, the combination of a frame, front and rear wheeled supports therefor, a rear axle mechanism including a housing and a driven gear mounted in said housing, a motor, a driven shaft, a propeller shaft between the shaft of said motor and said driven shaft for driving the latter, the motor shaft, propeller shaft and driven shaft being connected together in alinement, a counter shaft, reduction gearing between said counter shaft and said driven shaft, gearing between said counter shaft and said driven gear of said rear axle mechanism, and means for swingably supporting the front end of said motor.

7. In a motor vehicle, the combination of a frame, front and rear wheeled supports therefor, a rear axle mechanism including a housing and a driven gear mounted in said housing, a motor, a driven shaft, a propeller shaft between the shaft of said motor and said driven shaft for driving the latter, the motor shaft, propeller shaft and driven shaft being connected together in alinement, a counter shaft, reduction gearing between said counter shaft and said driven shaft, gearing between said counter shaft and said driven gear of said rear axle mechanism, means for swingably supporting the front end of said motor, and a rigid connection between the rear end of said motor and said rear axle housing, whereby said motor and rear axle always swing together as a unitary structure.

8. In apparatus of the class described, the combination of rear drive axle mechanism including a housing and a driven gear mounted therein, a casing secured to said housing, a driven shaft in said casing, a countershaft mounted in bearings in said casing, a driven gear interposed between said countershaft and said driven gear of said rear axle mechanism, chain gearing connections between said driven and counter shafts, and means for adjusting said driven shaft toward and from said counter shaft.

9. In apparatus of the class described, the combination of rear drive axle mechanism including a housing and a driven gear mounted therein, a casing secured to said housing, a driven shaft in said casing, a counter shaft mounted in bearings in said casing, a driven gear interposed between said countershaft and said driven gear of said rear axle mechanism, chain gearing connections between said driven and counter shafts, means for adjusting said driven shaft toward and from said counter shaft, and means for adjusting said counter shaft toward and from said driven gear of the rear axle mechanism.

10. In apparatus of the class described, the combination of rear drive axle mechanism including a housing and a driven gear mounted therein, a casing secured to said housing, a driven shaft in said casing, a counter-shaft mounted in bearings in said casing, a driven gear interposed between said counter shaft and said driven gear of said rear axle mechanism, chain gearing connections between said driven and counter shaft, a sleeve mounted in said casing eccentric to said driven shaft, bearings within said sleeve for said driven shaft, and means for angularly adjusting said sleeve.

11. In apparatus of the class described, the combination of rear drive axle mechanism including a housing and a driven gear mounted therein, a casing secured to said housing, a driven shaft in said casing, a counter shaft mounted in bearings in said casing, a driven gear interposed between said counter shaft and said driven gear of said rear axle mechanism, chain gearing connections between said driven and counter shafts, a sleeve mounted in said casing eccentric to said driven shaft, bearings within said sleeve for said driven shaft, one of said bearings being arranged adjacent to the driving gear on said driven shaft and the other adjacent to the free end of said driven shaft, and means for angularly adjusting said sleeve.

12. In apparatus of the class described, the combination of rear drive axle mechanism including a housing and a driven gear mounted therein, a casing secured to said housing, a driven shaft in said casing, bearings for said driven shaft arranged within said casing, an angularly adjustable support for said bearings mounted in said casing eccentric to the axis of said driven shaft, a counter shaft mounted in said casing, chain gearing connecting said driven and counter shafts, a driving gear between said counter shaft and said driven gear of the rear axle mechanism, and means for adjusting said angularly adjustable support.

13. In apparatus of the class described, the combination of a rear axle housing having an opening at one side thereof, a casing having one end connected to said rear axle housing so as to close said opening therein, said casing carrying bearing blocks extending into said rear axle housing, a differential mechanism mounted in said bearing blocks, a driven gear for said differential mechanism, a counter shaft mounted within said casing and having at one end a driving gear meshing with said driven gear for said differential mechanism, chain reduction gearing between the other end of said counter shaft and said driven shaft, and means for adjusting said driven shaft relative to said counter shaft.

14. In apparatus of the class described, the combination of a unitary structure comprising a casing, a driven shaft arranged in said casing, a counter shaft mounted in said casing, bearing blocks extending beyond one end of said casing, a differential mechanism mounted in said bearing blocks, gearing interposed between said differential mechanism and said counter shaft, means for adjusting said driven shaft relative to said counter shaft, and a rear axle housing having an opening therein to receive said differential mechanism and driven gear connected therewith, said opening being closed by the adjacent end of said casing of said unitary structure.

15. In apparatus of the class described, the combination of a rear axle mechanism including a housing and a driven gear mounted therein, a casing having a pair of vertically disposed webs one of said webs having two bearings therein and the other web having a single bearing alined with one of the bearings of said first mentioned web, a tube mounted in the alined bearings of said two webs, a driven shaft eccentrically mounted within said tube, a counter shaft mounted in the other bearing in said first mentioned web, chain reduction gearing between said driven and counter shafts, and a driving gear interposed between said counter shaft and said driven gear of said rear axle mechanism.

16. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism including a propeller shaft, means connecting the motor casing and axle housing together so that they will swing together as a unitary structure up and down and laterally relatively to said frame, a ball and socket universal joint disposed co-axially with the armature shaft of said motor and entirely at one end of said motor, the said ball being connected to move with said motor casing about the axis of said armature shaft, and means rigidly connecting said socket to said frame.

17. In an electric motor vehicle, the combination of a shaft drive axle including a housing with live axle sections and a differential mechanism incased thereby, an electric motor having its armature shaft disposed at right angles to said axle sections, gearing connections between said armature shaft and differential mechanism including a propeller shaft, means rigidly connecting said motor casing and axle housing together whereby they always move together as a unitary structure, a ball carried by said connecting means co-axially with the armature shaft of said motor, a vehicle frame, resilient supports between said frame and said rear axle housing, and a socket for said ball rigidly secured to said frame.

18. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism including a propeller shaft, means connecting the motor casing and axle housing so that they will swing together relatively to said frame as a unitary structure, a ball and socket universal joint disposed co-axially with the armature shaft of said motor and entirely at one end of said motor, the said ball being connected to move with said unitary structure about the axis of said armature shaft, and means rigidly connecting said socket to said frame.

19. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism including a propeller shaft, means connecting the motor casing and axle housing so that they will swing together relatively to said frame as a unitary structure, a ball and socket universal joint disposed co-axially with the armature shaft of said motor and entirely at one end of said motor, the said ball being connected to move with said unitary structure about the axis of said armature shaft, and means for rigidly connecting said socket to said frame, the propelling force from said axle being transmitted to said frame through the said universal joint.

20. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism including a propeller shaft, means connecting the motor casing and axle housing so that they will swing together relatively to said frame as a unitary structure, a ball and socket universal joint disposed co-axially with the armature shaft of said motor and entirely at one end of said motor, the said ball being connected to move with said unitary structure about the axis of said armature shaft, and means rigidly connecting said socket to said frame, torsional impulses on said rear axle housing being counteracted between the elements of said universal joint.

21. In an electric motor vehicle, the combination with a vehicle frame, a wheeled support for the front end of said frame, and a wheeled support for the rear end of said frame including a drive axle having a housing with live axle sections and differential mechanism incased thereby, of an electric motor having its armature shaft arranged longitudinally of said frame, gearing connections between said armature shaft and said differential mechanism including a propeller shaft, means connecting the motor casing and axle housing so that they will swing together relatively to said frame as a unitary structure, a ball and socket universal joint disposed co-axially with the armature shaft of said motor and entirely at one end of said motor, the said ball being connected to move with said unitary structure about the axis of said armature shaft, and means rigidly connecting said socket to said frame, the propelling force from said axle to said frame being transmitted through and the torsional impulses on said axle housing being counteracted between, the elements of said universal joint.

In testimony whereof I affix my signature, in the presence of two witnesses.

EMIL GRUENFELDT.

Witnesses:
S. M. MICKEY,
IRENE HAMMOND.